United States Patent
Dunne et al.

(10) Patent No.: US 10,530,829 B2
(45) Date of Patent: Jan. 7, 2020

(54) SCREEN SHARE RECONSTITUTION

(71) Applicant: INTERNATIONAL BUSINESS MACHINES CORPORATION, Armonk, NY (US)

(72) Inventors: Jonathan Dunne, Dungarvan (IE); James P. Galvin, Jr., Georgetown, KY (US); Liam Harpur, Dublin (IE); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 15/220,492

(22) Filed: Jul. 27, 2016

(65) Prior Publication Data

US 2018/0034886 A1 Feb. 1, 2018

(51) Int. Cl.
*H04L 29/06* (2006.01)
*H04L 12/18* (2006.01)
*H04L 12/26* (2006.01)

(52) U.S. Cl.
CPC .......... *H04L 65/80* (2013.01); *H04L 12/1831* (2013.01); *H04L 43/04* (2013.01); *H04L 43/08* (2013.01); *H04L 43/0811* (2013.01); *H04L 43/16* (2013.01); *H04L 65/403* (2013.01)

(58) Field of Classification Search
CPC ............. G06F 11/3409; G06F 11/3438; G06F 11/3495; G06F 15/16; G06F 15/173; G06F 15/177; G06F 2201/875; G06F 2201/88; G06F 2201/885; H04L 12/1822; H04L 12/1827; H04L 12/1831; H04L 43/0811; H04L 43/16; H04L 65/403; H04L 65/80; H04N 19/154; H04N 7/147; H04N 7/15; H04N 7/183
See application file for complete search history.

(56) References Cited

U.S. PATENT DOCUMENTS

| | | | |
|---|---|---|---|
| 7,490,169 B1 | 2/2009 | Ogdon et al. | |
| 8,527,588 B2 | 9/2013 | Beck et al. | |
| 8,994,777 B2 | 3/2015 | Chazin et al. | |
| 9,369,570 B1 | 6/2016 | Kolodizner et al. | |

(Continued)

OTHER PUBLICATIONS

IBM: List of IBM Patents or Patent Applications Treated as Related (Appendix P), Aug. 16, 2017, pp. 1-2.

(Continued)

*Primary Examiner* — Christopher Biagini
(74) *Attorney, Agent, or Firm* — Michael A. Petrocelli (57) ABSTRACT

A method and system ensures recording quality of a web conference in a computer networked environment. A web conference is monitored including a client computer initiating the web conference and a network connection for a server computer used to share the client computer screen with other client computers in a networked computer environment communicating with the server. A quality of service (QoS) level is determined for a server network connection of the server computer and a client network connection of the client computer. The QoS level is determined using one or more factors. The web conference is recorded using the server network connection at the server computer or at the client network connection at the client computer based on the QoS threshold being met using the server network connection for recording the web conference.

20 Claims, 7 Drawing Sheets

(56) References Cited

U.S. PATENT DOCUMENTS

| | | | |
|---|---|---|---|
| 2006/0007913 A1* | 1/2006 | Botkin | H04L 47/15 |
| | | | 370/352 |
| 2006/0023061 A1* | 2/2006 | Vaszary | H04M 3/56 |
| | | | 348/14.08 |
| 2006/0217112 A1* | 9/2006 | Mo | H04W 36/14 |
| | | | 455/422.1 |
| 2008/0008296 A1 | 1/2008 | Williams et al. | |
| 2008/0008458 A1 | 1/2008 | Gudipaty et al. | |
| 2008/0049786 A1* | 2/2008 | Ram | G06F 9/5083 |
| | | | 370/468 |
| 2009/0041114 A1 | 2/2009 | Clark | |
| 2011/0316965 A1 | 12/2011 | Moore et al. | |
| 2012/0274730 A1* | 11/2012 | Shanmukhadas | H04N 7/147 |
| | | | 348/14.08 |
| 2013/0151614 A1* | 6/2013 | Beerse | H04N 7/183 |
| | | | 709/204 |
| 2013/0339431 A1* | 12/2013 | Yannakopoulos | |
| | | | H04L 12/1827 |
| | | | 709/204 |
| 2016/0134428 A1 | 5/2016 | Ouyang et al. | |

OTHER PUBLICATIONS

Pending U.S. Appl. No. 15/664,395, filed Jul. 31, 2017, entitled: "Screen Share Reconstitution", pp. 1-39.

Wikipedia, "Quality of Service", printed on Oct. 27, 2015, pp. 1-11, https://en.wikipedia.org/wiki/Quality_of_service.

Wikipedia, "Multiplexing", printed on Oct. 27, 2015, pp. 1-7, https://en.wikipedia.org/wiki/Multiplexing.

* cited by examiner

SCREEN SHARE RECONSTITUTION

BACKGROUND

The present disclosure relates to a method and system related to recording web conference streaming, and more particularly to ensuring quality of a recording of a web conference.

Web conferencing can be used to share a presentation or provide screen sharing so that a presenter can convey information to an audience. Also, a web conference can be used for collaboration between audiences at different locations. Such web conferences, at a source location and at various remote locations, rely on a network, for example, a communications network and/or a computer network, to ensure that the content of the web conference can be viewed in real time. The networks and the computers in the network are also relied upon to provide a visual quality of the web conference, which can be assessed by evaluating visual quality and content of the web conference including visual lag, picture quality, and sound quality, and malformed visual artifacts. The web conference streaming to other locations can also suffer from interruptions where a user may not be able to see a screen share page fully rendered due to network issues, which can include latency, packet loss and other QoS issues.

For example, it may be noted that for a web conferencing system that allows meetings to be recorded, poor network conditions on the server side connection or component(s) can result in a recording at a server that will include malformed screen rendering(s) due to temporal network conditions. A web conference can originate from a client computer. The server side connection or components can communicate with one or more client side connections or components, including the initiating (source) client computer. There can be one or more viewers that are remote from both the server and the initiating client computer. Temporal network conditions can cause less than desirable real time rendering of a web conference being viewed by users, and less than desirable recording of the web conference, for instance, at a server which is remote from a local initiating client computer.

SUMMARY

In one example, it would be beneficial for a system and method to provide monitoring of a computer network connection (server connection) used for sharing a client computer initiated web conference (as a screen sharer) which is shared with one or more client computers. The web conference can be initiated from a client computer or multiple client computers. The monitoring can include monitoring the network connection of a server for a temporal Quality of Service or Quality of Service level. The temporal QoS can be compared to a predetermined network Quality of Service (QoS) threshold. Local client side recording of a screen share session can be initiated when a network QoS threshold is not attained by a server connection. The method and system can perform analysis of a server side web conference recording to determine regions with poor visual recorded artifacts. The method and system can use a multiplexer to multiplex local and server side recordings to provide an optimal recording.

According to an aspect of the present invention, a method ensures recording quality of a web conference in a computer networked environment. The method includes monitoring a web conference including a network connection for a server computer which is connected to a client computer initiating the web conference. The client computer has a shared client computer screen which is shared with one or more other client computers in a networked computer environment communicating with the server. The server computer is remote from the client computer. A quality of service (QoS) threshold is set for users viewing the web conference, and the QoS threshold including one or more factors. A QoS level is determined at a server network connection of the server computer, and the QoS level is determined using the one or more factors. The method records the web conference using the server network connection at the server computer, or at a client network connection at the client computer, based on the QoS threshold being met using the server network connection for recording the web conference.

In another aspect according to the present invention, a system ensures recording quality of a web conference in a computer networked environment. The system comprises a computer system comprising: a computer processor, a computer-readable storage medium, and program instructions stored on the computer-readable storage medium being executable by the processor, to cause the computer system to perform a method, comprising: monitoring a web conference including a network connection for a server computer being connected to a client computer initiating the web conference, the client computer having a shared client computer screen being shared with one or more other client computers in a networked computer environment communicating with the server, the server computer being remote from the client computer; setting a quality of service (QoS) threshold for users viewing the web conference, the QoS threshold including one or more factors; determining a QoS level at a server network connection of the server computer, the QoS level being determined using the one or more factors; and recording the web conference using the server network connection at the server computer, or at a client network connection at the client computer, based on the QoS threshold being met using the server network connection for recording the web conference.

In another aspect according to the present invention, a computer program product ensures recording quality of a web conference in a computer networked environment. The computer program product comprises a computer readable storage medium having program instructions embodied therewith, wherein the computer readable storage medium is not a transitory signal per se, and the program instructions executable by a computer to cause the computer to perform a method, comprising: monitoring a web conference including a network connection for a server computer being connected to a client computer initiating the web conference, the client computer having a shared client computer screen being shared with one or more other client computers in a networked computer environment communicating with the server, the server computer being remote from the client computer; setting a quality of service (QoS) threshold for users viewing the web conference, the QoS threshold including one or more factors; determining a QoS level at a server network connection of the server computer, the QoS level being determined using the one or more factors; and recording the web conference using the server network connection at the server computer, or at a client network connection at the client computer, based on the QoS threshold being met using the server network connection for recording the web conference.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Referring to FIGS. 1, 2, 3 and 4, a system 10 and method 100 are shown with reference to a system 10 for ensuring recording quality of a web conference in a computer networked environment. For example, one or more shared screens can display a web conference which was initiated from a client computer. In one embodiment, a local client computer (or client computer) embodied as a first client computer 64 initiates a web conference 30 for sharing with other client computers (collectively embodied as a second client computer 74) using a server (also referred to as a server computer) 20. In this example, the server is remote with respect to the client computer which is initiating the web conference and sharing its screen, and the other client computers. The server 20 enables broadcasting or streaming of the web conference 30 (for example, using a virtual private network (VPN) to one or more other client computers). The web conference can be recorded at the first client computer, at the server 20, or alternatively as other client computers (collectively referred to as the second client computers 74). The first client computer is at a first local location 60, and additional or other client computers collectively referred to as the second client computer 74 referred to as at a collective second local location 70. A user 14 can view the web conference 30 at the first local location 60 (at the first client computer), or at the second local location 70 (at the second client computer 74), and in another example, can view the conference 30 at the remote location 40 at the server 20.

Figure 8:
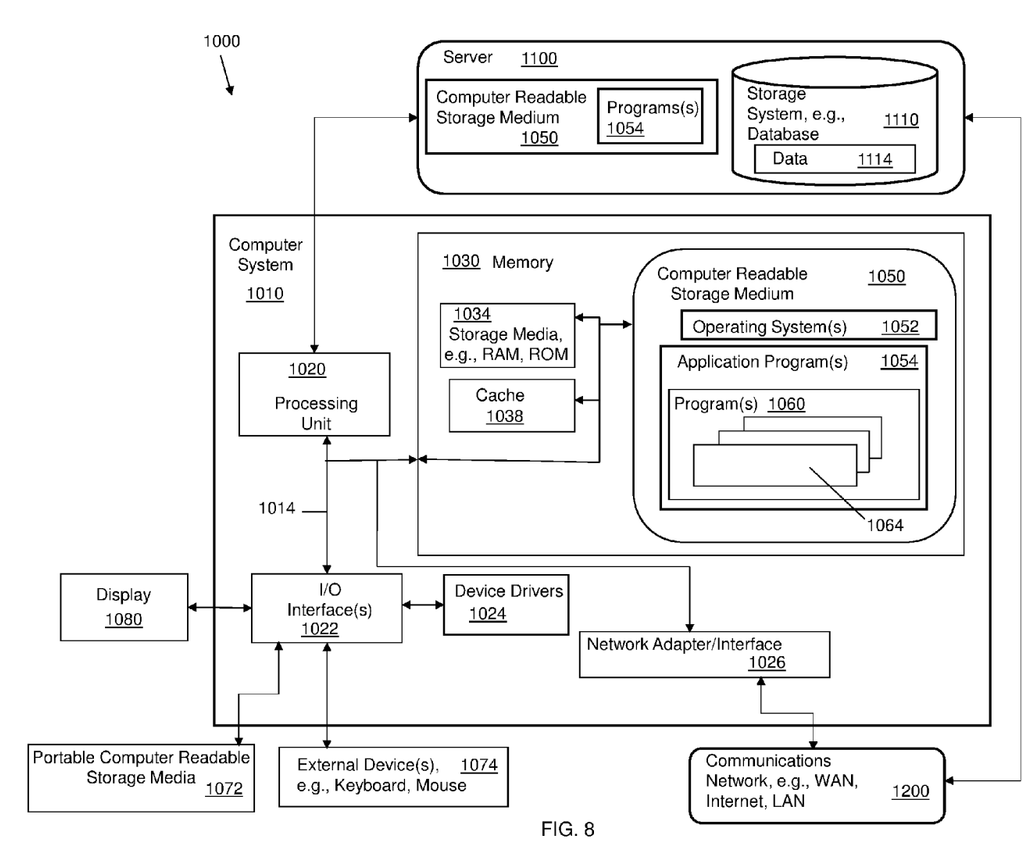
FIG. 8 is a schematic block diagram depicting a computer system according to an embodiment of the disclosure which includes a detailed depiction of a computer (shown generally in FIG. 1), and which cooperates with the system and methods shown in FIGS. 1, 2, and 3.

The server 20 and the first and second client computers 64, 74 include a computer 1010, which is discussed in more detail with reference to FIG. 8 in relation to a computer system 1000. It is understood that the server 20, and the first and second client computers 64, 74 and the computer 1010 are representative or illustrative of many alternative computer devices and are presented here as generic representations for the purposes of the embodiment(s) of the present invention. In the embodiment discussed below, for illustrative purposes, the method of the present disclosure can be embodied in a computer program 1060 (FIG. 8) or a software application stored on the computer 1010, or stored on another storage device communicating with the server 20 and the client computers. The first and second client computers 64, 74, also can each include a computer system generically referred to as computer 1010. The server and the first and second client computers, can communicate with each other using a communications network 50 (e.g., the Internet). The embodiments of the method of the present disclosure can be captured in a software application or program, for example, the program 1060 in the computer 1010 (FIG. 8). The program 1060 can be a separate application, and alternatively can be part (or integral with) of another application. The method can also be provided as a service, for instance, using a remote server exemplified by the remote server 1100. Alternative embodiments can include a computer program stored remotely (for example, on a remote server 1100 (FIG. 8)), and, for example, implemented as a service.

Figure 1:
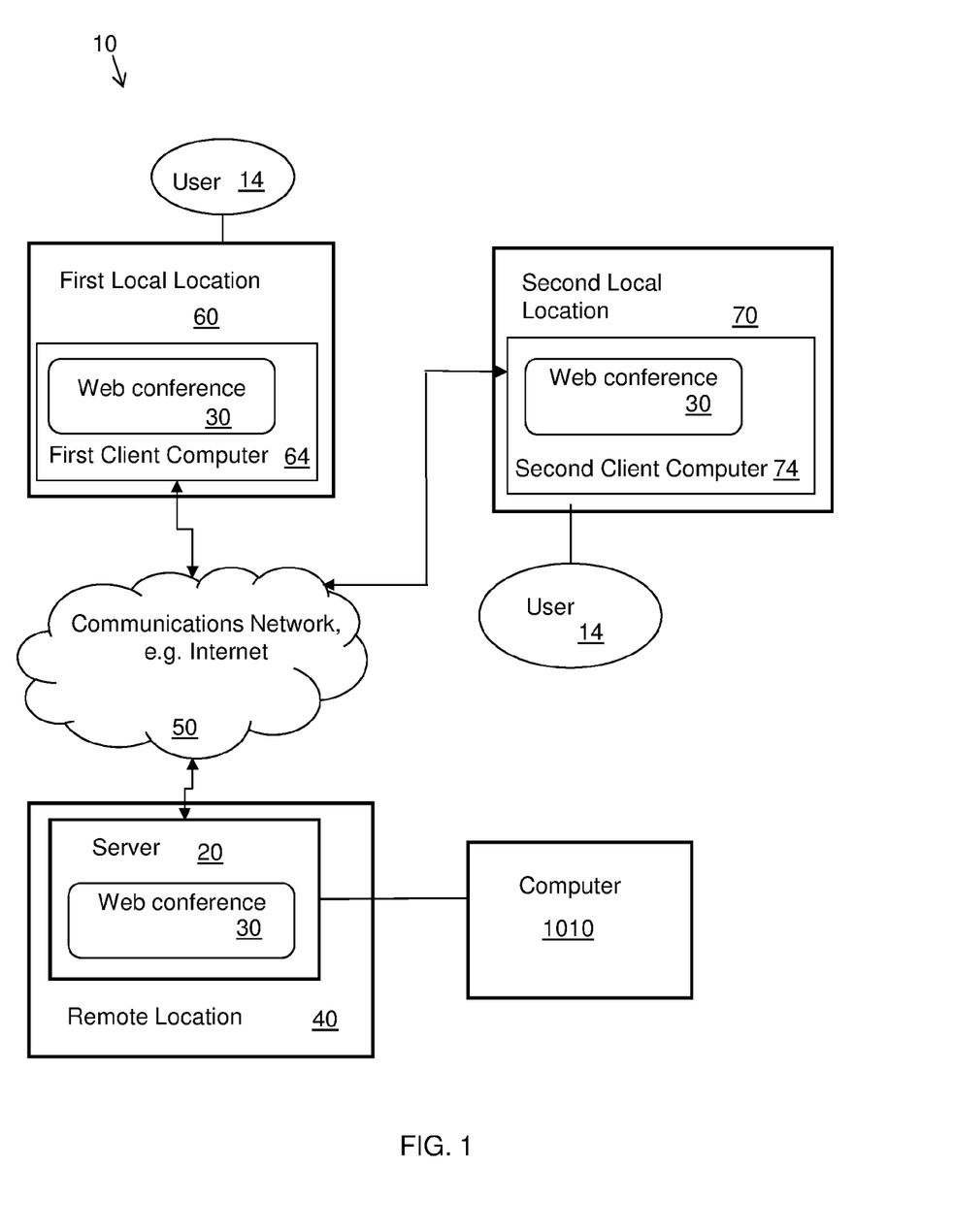
FIG. 1 is a schematic block diagram illustrating an overview of a system and methodology for ensuring recording quality of a web conference in a computer networked environment.
Figure 2:
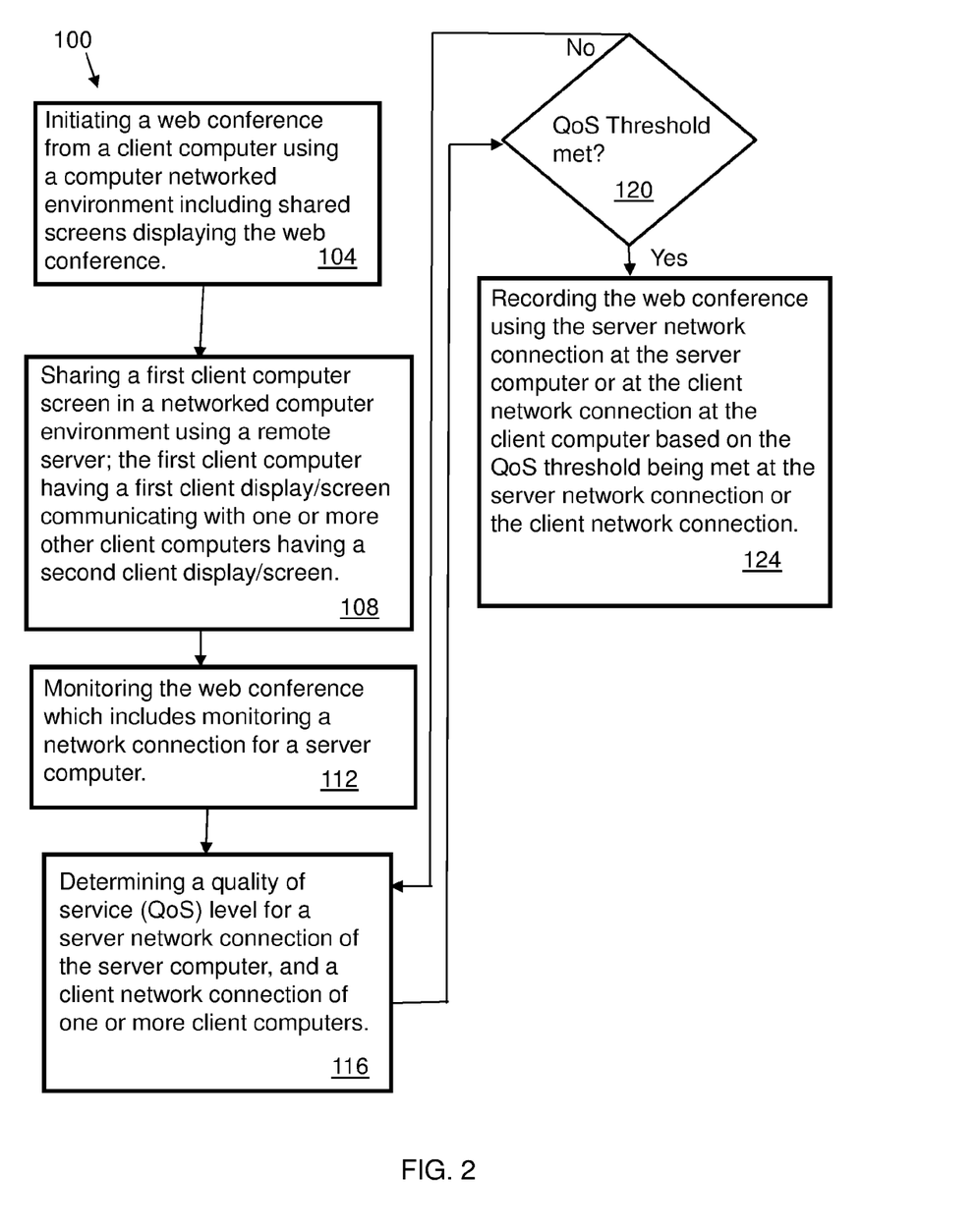
FIG. 2 is a flow chart illustrating a method for ensuring recording quality of a web conference in a computer networked environment based on the system shown in FIG. 1, according to an embodiment of the disclosure.
Figure 4:
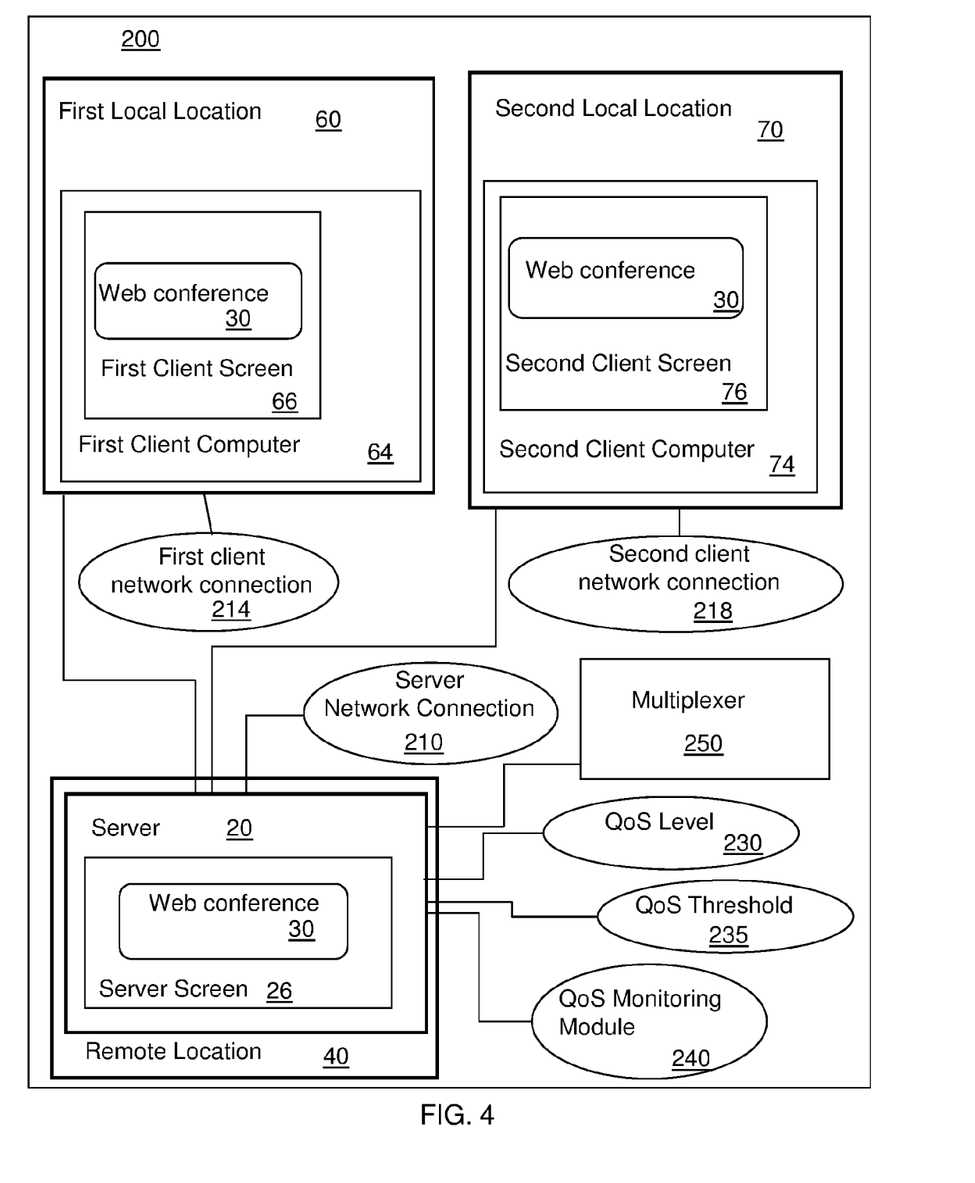
FIG. 4 is a functional block diagram according to an embodiment of the disclosure of a networked computer environment or system used in implementing the method shown in FIGS. 2 and 3 and in accordance with the system shown in FIG. 1, for ensuring recording quality of a web conference.

Referring to FIGS. 1, 2 and 4, in one embodiment according to the present invention, a method 100 includes initiating a web conference 30. The web conference 30 uses a computer networked environment which includes shared screens displaying the web conference. A first client computer 64 initiates a web conference 30, as in block 104.

The first client computer 64 shares a first client screen 66 with other client computers using the communications network 50 and the server 20. Thus, the shared first client screen 66 is shared in a networked computer environment 200, and the first client computer 64 and screen 66 communicate with the second client computer 74 and second client screen 76, as in block 108.

In block 112 of the method 100, the web conference is monitored. Monitoring the web conference includes monitoring a network connection 210 for the server computer 20 having a server screen 26, which can in one example display the web conference 30.

The server screen and the client screens can also be referred to as displays. The server 20 is remote (at remote location 40) in relation to the first and second client computers 64, 74. The first client computer 64 is located at the first local location 60, and the second client computer 74 is located at the second local location 70.

Referring to FIGS. 2 and 4, the method includes determining a quality of service (QoS) level 230 for a server network connection 210 of the server 20, as in block 116. A quality of service level 230 can also be determined for a client network connection of the client computer sharing the screen of the server computer. In this example, where the first client computer is sharing its screen, the local computer will meet a QoS threshold 235. For example, the local computer is not subjected to network conditions that can degrade the web conference quality for viewing and recording. A QoS threshold 235 is determined or set at a specified quality level (QoS level) which is determined to provide a satisfactory level of quality for recording and future viewing of the web conference. The QoS threshold level can be determined with reference to multiple options regarding quality of recording, which can be part of a software package, selected by an administrator, or selected or determined from one or more users.

In the embodiment of the present invention shown in FIG. 4, a first client network connection 214 and second client network connection 218 are embodiments of one or more client computers and respective client network connections. The QoS level 230 can be determined using a QoS monitoring module 240 of a computer program, embodied as computer program 1060. The QoS level includes one or more factors (discussed below).

When the QoS threshold is met (block 120) at the server network connection, the method includes recording the web conference using the server network connection at the server computer. Alternatively, the web conference can be recorded at one or more client computers, based on the client computers meeting the QoS threshold, for example at the first client computer 64. Thus, the web conference is recorded at the server network connection or at the client network connection at the client computer based on the QoS threshold being met at the server network connection or at the client network connection, as in block 124. When the QoS threshold is not met, the method returns to block 116 to determine a network connection to a computer that does meet the QoS threshold, for example, at the first client computer 64. The client computer, for example, the first client computer will typically meet the QoS threshold as the client computer initiating the web conference is recording locally.

Figure 3:
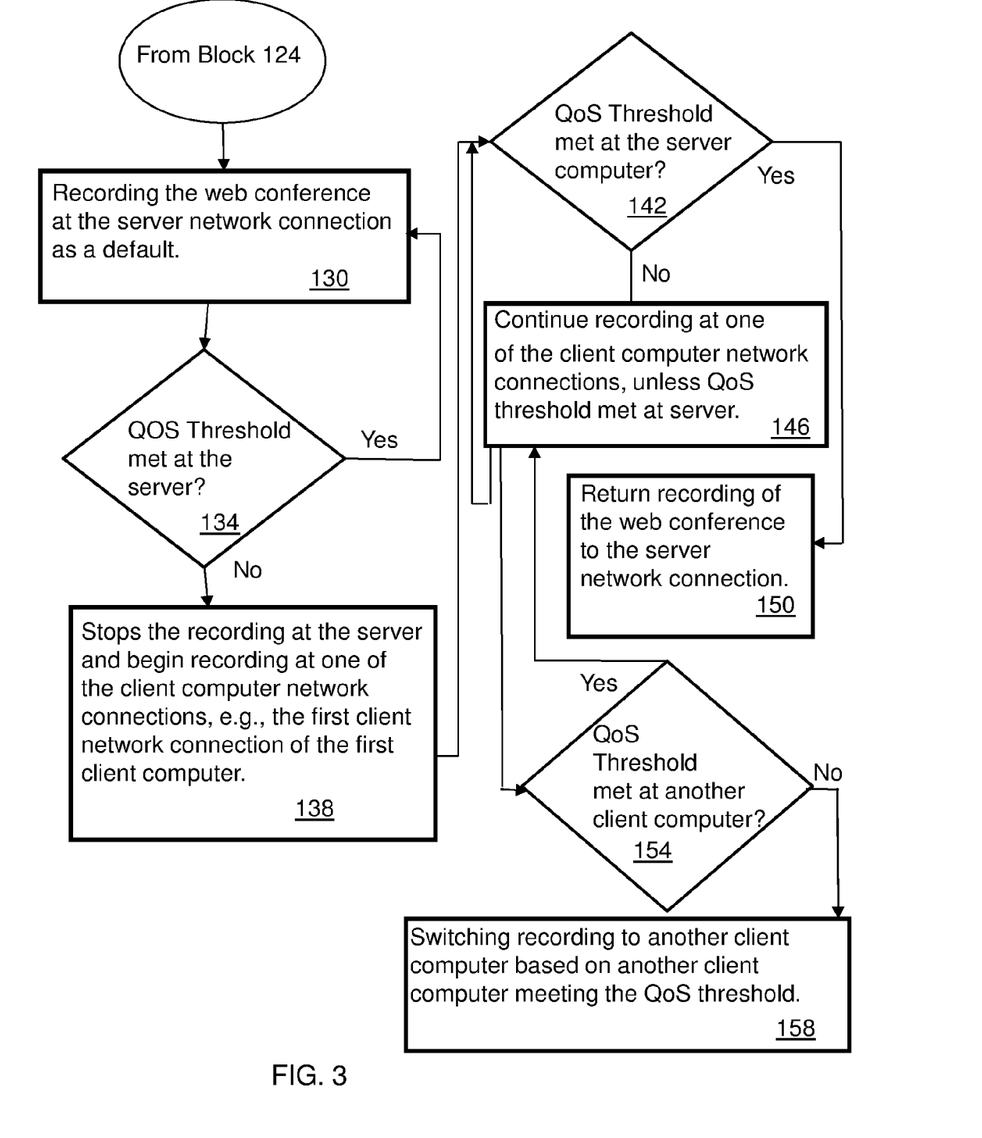
FIG. 3 is a flow chart continuing from the flow chart of FIG. 2.

Referring to FIG. 3, more specifically, the method 100 can in one embodiment, record the web conference at the server network connection as a default, as in block 130. If the QoS threshold is met while recording at the server network connection (block 134), the method continues the recording (block 130). If the QoS threshold is not met at the server, the method stops the recording at the server and begins recording at one of the client computer network connection, in this embodiment, at the first client network connection for the first client computer, as in block 138.

Referring again to FIG. 3, when the server computer again meets (or returns to meeting) the QoS threshold (block 142), the method returns to recording the web conference at the server computer, as in block 150. When the QoS threshold continues to not be met at the server computer (block 142), the method continues to record at one of the client computer connection (as in block 146), in the embodiment above, at the first client computer 64.

In one example according to the present disclosure, when the QoS threshold is met at the server computer as discussed above (at blocks 142 and 150), it is preferable to record at the server computer. Recording locally (at a client computer) can add load to the client system, and have undesirable affects to a local system and its resources, such as loading network bandwidth.

In one embodiment, when the QoS threshold is not met at the server (which can be recording the web conference), recording can be switched to another or second client computer which meets the QoS threshold. The second client computer can be presenting a web conference or part of a web conference in a multi-presenter/user or multi-client presentation of a web conference, as in blocks 154 and 158.

Thus, in one example, the method monitors the QoS level 230 at the server computer and the client computers to determine when the QoS threshold 235 is being met at the server computer and/or the client computers. The method can switch between the server computer and the client computers, in response to the server computer and one or more of the client computers meeting the QoS threshold.

In one example, the recording can be recorded for a subsequent re-presentation, or recorded and presented with a time delay. Regardless of the re-presentation of the recording, the recording is available at a level of quality according to the present disclosure for later viewing and presentation.

A plurality of techniques or factors can be used to assess the quality of the web conference. In one example, an offline reference video can be used to compare (for instance in real time) with the current web conference (which is being recorded). Such a comparison can be made by a designated person such as a network administrator or one or more users. In another example, network measurements can be taken (e.g., latency, packet loss, jitter, etc.) at the site of the recording, for instance the server connection (of the server) or the client connection (of the client computer). The measurements or metrics can be used to ascertain a video quality.

In another example, the QoS can be calculated using a technique or factors including a mean opinion score (MOS) from users. The users viewing the web conference on one or more client computers at one or more client locations, respectively, can assess the web conference (e.g., video conference), and assess or score the web conference as they perceive it. Scores can include, for example, a score of 5 for excellent quality, and imperceptible impairment; a score of 4 for good quality, and perceptible but not annoying impairment; a score of 3 for fair quality, and slightly annoying impairment; a score of 2 for poor quality, and annoying impairment; and a score of 1 for bad quality, and very annoying impairment. Such scores can be averaged for a plurality of users to achieve a mean opinion score (MOS) for all users or all users participating in the assessment.

In one example, as part of a user joining a web conference or e-meeting (which can be initiated using Voice Over Internet Protocol (VoIP)), users can download a meeting plugin (e.g., a software component) which allows enables local recording. In this scenario, once the QoS drops below a threshold, the system determines that local recording should be conducted and communicates from the meeting server to the local plugin to being recording locally at a client computer. When the QoS for the server recording has increased to a pre-determined threshold (e.g., a MOS score of 3 in FIG. 5) the meeting server communicates with the local client plugin to pause recording locally, and allows for server side recording (remote recording) to resume.

Figure 5:
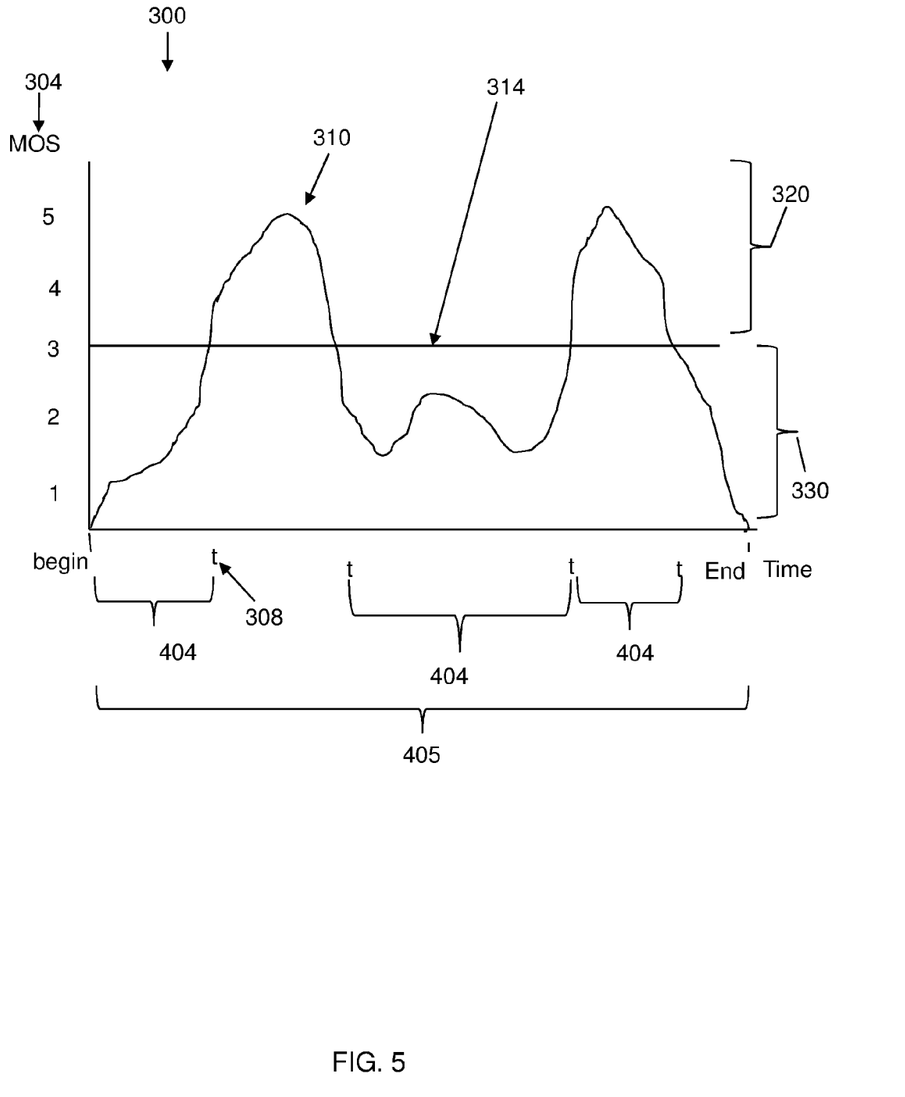
FIG. 5 is a graph of a quality score for a web conference quality according to an embodiment of the disclosure showing a score on a vertical axis, and a time on a horizontal axis.
Figure 6:
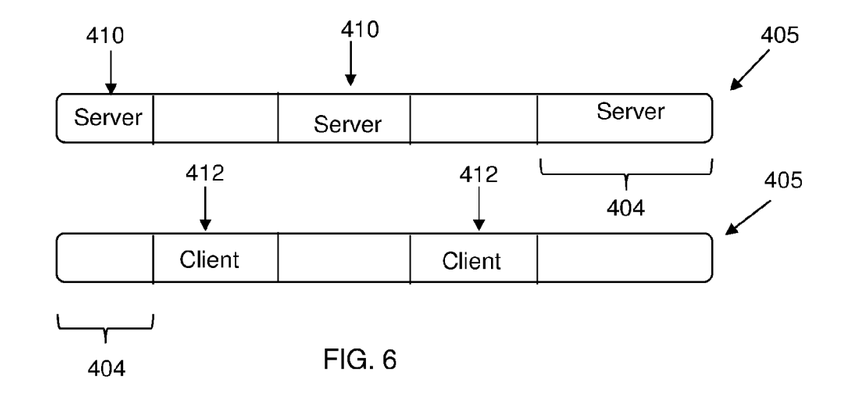
FIG. 6 is a functional block diagram according to an embodiment of the disclosure of time segments of a recording indicating at which location a web conference is recorded.

Referring to FIG. 5, a chart 300 shows MOS 304 ratings 1 through 5 with a mean of 3 (designated by line 314), for the web conference over periods or segments of time 404 with time or time marks being designated as "t" 308, in real time, at the server. The time periods or segments 404 are designated as shown in FIGS. 5 and 6. The total time period or total time of the web conference is designated as total time 405. A MOS graph line 310 shows how the MOS changes over time. In this embodiment, the QoS threshold is considered to be 3 on the MOS rating. Thus, when the MOS graph line is over a MOS score of 3 (depicted by bracket 320), the method records using the server connection. When the MOS graph line is under the MOS score of 3 (depicted by bracket 330), the method records the web conference locally at a client computer.

Referring to FIG. 6, time periods segments 404 of the web conference are shown and designated as to where the web conference is recorded, that is, when recorded at the server designated as a server recording 410, and when recorded at a client computer designated as a client recording 412. The web conference has a begin time and an end time, and a complete time or total time 405 being the time from beginning to end. The time period segments, extended contiguously, correspond to the complete web conference.

Thus, the method and system according to the present disclosure can record the web conference alternately and selectively at first, second, or third, etc., connections, such as the server network connection, or the client network connection, for example the first client computer, when each of the network connections meet the QoS threshold.

Figure 7:
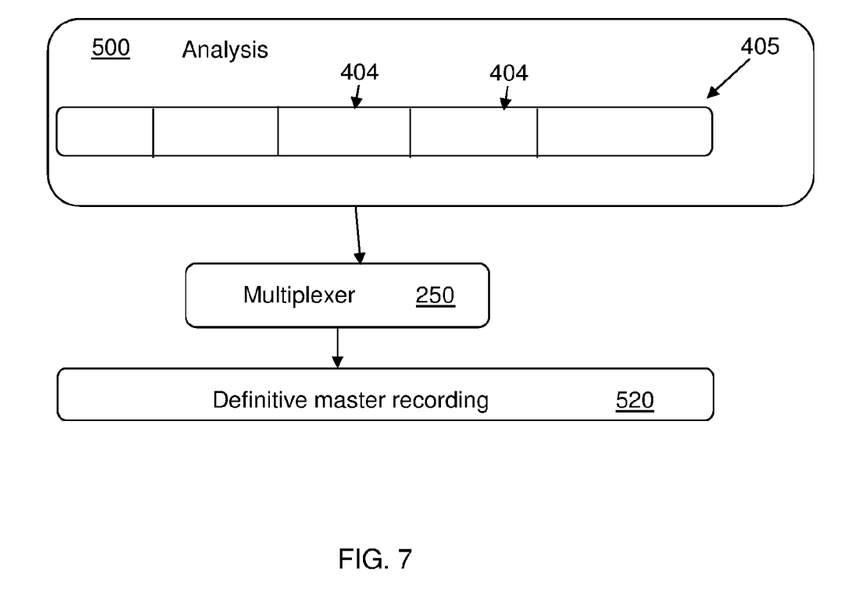
FIG. 7 is a functional block diagram according to an embodiment of the disclosure of time segments of a recording, and a master recording including all the time segments.

The method performs an analysis 500, as depicted in FIG. 7, of the time segments 404 for the server recordings and the client recordings to ascertain which time segments were recorded at the server and which were recovered at one or more clients. The method then can use a multiplexer 250 for video multiplexing of the remote client recordings and the server recordings (corresponding to time periods 404) to create a combined recording as a definitive master recording 520 of the web conference as shown in FIG. 7. The definitive master recording corresponding to the total time 405 of the recording.

Thus, as discussed above referring to FIGS. 5, 6 and 7, for example, when recording the web conference using the server network connection at the server computer, the length of time of the web conference is parsable into time segments based on the place of recording. Thereby, the time segments of the web conference recorded at the server network connection of the server computer and the first client network connection of the first client computer, respectively, can be analyzed to associate each of the time segments meeting the QoS threshold. The time segments can then be re-assembled into a master recording such that the time segments equal the length of time (total time 405) of the web conference in a definitive master recording 520.

In one embodiment according to the present disclosure, multiple QoS thresholds can be applied to respective source material being shown in the web conference. For example, the web conference can be recorded at the server network connection when the server network connection meets or exceed a first QoS threshold for a first source material being shown on the shared client computer screen. The web conference can be recorded at the server network connection when the server network connection meets or exceed a second QoS threshold for a second source material being shown on the shared client computer screen. In a more specific example, a first file format can have its own QoS threshold so that when a web conference screen shows a screen having the first file format, for instance which can include a chart or a picture using the first file format, a first QoS threshold needs to be met to record at a server. A second file format can have a second QoS threshold higher or lower than the first file threshold which needs to be met to record at a server.

In another aspect according to the present disclosure, a visual cue can alert someone (e.g., a moderator) of the poor network QoS and to alert all web conference users when client side or server side recording is initiated. In another embodiment, the QoS threshold can include determining if words are garbled (measured, for example, by whether transcription software could interpret the words), and thus client side recording can be initiated from recording at a server.

The above embodiment of the present disclosure solve problems with multiple user in different locations viewing a web conference. The problems can include network issues that cause undesirable effects such as a visual lag or malformed visual artifacts on the screen. Conferencing can suffer from frequent interruptions where a specific user may not be able to see a screenshare page fully rendered due to network issues which as latency, packet loss and other QoS concerns. Importantly for a web conferencing system that allows meetings recording, poor network conditions to the server side component can result in a recording that will contain malformed screen rendering due to temporal network conditions.

The embodiments discussed above in the present disclosure enable a web conference recording of high quality, meeting a QoS threshold, and provide a solution to shared content can be viewed without visual lag, visual distortions, or malformed visual artifacts on the screen when viewing the web conference.

The embodiment of the present disclosure solves the above problems above by providing a method and system for monitoring predefined network QoS thresholds, and monitoring a screen sharer's network connection to determine temporal QoS. Once a network QoS threshold is reached, the method and system can initiate server side (can also be referred to as remote) recording of the screen share session/web conference. And in alternative embodiments, the method and system can alternately record at a client side or a server side based on whether the server meets the QoS threshold. The method and system performs analysis of a server side web conference recording to determine when a QoS threshold is met, for example, including regions with poor visual recorded artifacts. The system and method multiplexes client side and server side recordings to ensure optimal recording on a multiplexed master recording.

The disclosed embodiments enable a client side recording when necessary, as a client side recording can be expensive and/or load a local network, for instance, using network bandwidth. The present method and system uses a MOS metric to arbitrate when and where the recording quality from the server side is deemed unacceptable, and when a client side recording is acceptable and required to ensure optimal recording quality. Additionally, the client side network connection can be selected from multiple client side connections, or multiple client side presentations of the web conference or multiple web conferences having the highest QoS (based on temporal network conditions). Such as technique, as disclosed in the embodiments herein, is advantageous over applying a flat based rule to initiate client side recording.

Thereby, the embodiments of the present disclosure provide a method for ensuring recording quality of a collaborative meeting including monitoring network quality of service (QoS) for a web conference to determine an assessment; and controlling recording of the web conference based on the assessment. A MOS (mean opinion score) can be used for the assessment. A notification of change can be provided to a range of QoS selected from a group which includes unacceptable, marginal, and acceptable. The web conferences can be recorded as a first segment on a first system and a second segment on a second system. A final recording can be produced by combining the first segment and the second segment.

Responsive to detecting a QoS level on a first system, such as a server side, or at a server connection, exceeding a predetermined acceptable threshold, the system and method can automatically initiating recording on the first system. Further, responsive to detecting a QoS level on the first system (e.g., server side or at a server) falls below the predetermined acceptable threshold, the method and system can inhibit recording on the first system, for example, stopping recording at the server side, and initiating recording locally at a client computer. Additionally, the recording can be selected from a group including an audio presentation, a video presentation, and an audio/video presentation.

Referring to FIGS. 1 and 8, the server 20 includes a computer system 1010. The server 20 can access a remote server or computer 1100 using a communications network 1200 (e.g., the Internet) (FIG. 8). A computer system 1010 is a generic representation of a computer which may be embodied in a device such as a server for providing the method of the present disclosure as a service which can be accessible using the Internet or a network. The computer system is described in more detail below. The embodiments of the method of the present disclosure can be captured in a software application or program, for example, a program(s) 1060 in the computer 1010. The program 1060 can be a separate application(s), and alternatively can be part of (or integral with) another application. The method can also be provided as a service which can be remote, for instance, including an application residing on a remote server exemplified by the remote server 1100.

Referring to FIG. 8, a system 1000 includes a computer system or computer 1010 shown in the form of a generic computing device. The method 100, for example, may be embodied in a program(s) 1060 (FIG. 8) embodied on a computer readable storage device, for example, generally referred to as memory 1030 and more specifically, computer readable storage medium 1050 as shown in FIG. 8. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 8 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 8 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 8, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for ensuring recording quality of a web conference in a computer networked environment, comprising:

monitoring a web conference including a network connection for a server computer being connected to a client computer initiating the web conference, the client computer having a shared client computer screen being shared with one or more other client computers in a networked computer environment communicating with the server, the server computer being remote from the client computer, the web conference having a beginning time and an end time, and a complete length of time determined by the begin time and the end time, the complete length of time being parsable into time segments based on recording at a server network connection and a client network connection;

setting a quality of service (QoS) threshold for recording and displaying the web conference for viewing the web conference by users, the QoS threshold including one or more factors;

determining a QoS level at the server network connection of the server computer, the QoS level being determined using the one or more factors;

recording the web conference using the server network connection at the server computer, or at the client network connection at the client computer, but not at both, based on the QoS threshold being met using the server network connection for recording the web conference;

selecting a client computer of the one or more client computers for recording the web conference based on a QoS level at each of the one or more client computers;

initiating the recording on the selected client computer;

monitoring the QoS level at the server computer to determine when the QoS threshold is met at the server network connection;

switching the recording between the server computer using the server network connection and the client computer using the client network connection for respective time segments of the recording, in response to the server network connection meeting the QoS threshold, and falling below the QoS threshold, respectively, thereby recording the web conference at the client computer when the server network connection falls below the QoS threshold;

parsing the web conference into time segments based on the complete length of time of the web conference and based on a place of recording;

associating each of the time segments with meeting the QoS threshold and the place of recording, that is the server computer or the client computer; and re-assembling the time segments into a master recording form the server computer and the client computer, the time segments equal the complete length of time of the web conference in the master recording which includes all the time segments that compose the complete length of time.

2. The method of claim 1, further comprising:
recording the web conference alternately at the server network connection or the client network connection;
recording the web conference at the server network connection in response to the server network connection meeting or exceed the QoS threshold; and
recording at the client network connection in response to the QoS threshold not being met at the server network connection.

3. The method of claim 1, further comprising:
recording the web conference using the server network connection at the server computer, the web conference having a beginning time and an end time, and a complete length of time determined by the begin time and the end time, the complete length of time being parsable into time segments based on recording at the server network connection and the client network connection;
determining when the QoS threshold is not met at the server network connection of the server computer;
initiating a local recording at the client network connection at the client computer, in response to the QoS threshold not being met at the server network connection;
returning to the recording of the web conference at the server network connection, in response to the QoS threshold being met or exceeded at the server network connection;
analyzing the time segments of the web conference recorded at the server network connection and the client network connection to associate each of the time segments with meeting the QoS threshold, the time segments being equal to the complete length of time of the web conference; and
creating a master recording consisting of the time segments meeting the QoS threshold and equal to the complete length of time of the web conference.

4. The method of claim 3, wherein the creating the master recording uses multiplexing.

5. The method of claim 1, further comprising:
setting multiple QoS thresholds respective to source materials being shown on the shared screen of the client computer; and
recording of the web conference at the server network connection for each of the source materials in response to the server network connection meeting or exceeding the QoS threshold for the respective source material.

6. The method of claim 1, further comprising:
recording the web conference at the server network connection in response to the server computer meeting or exceeding the QoS threshold;
setting multiple QoS thresholds respective to source materials being shown on the shared screen;
recording the web conference at the server network connection when the server network connection meets or exceed a first QoS threshold for a first source material being shown on the shared client computer screen; and
recording the web conference at the server network connection when the server network connection meets or exceed a second QoS threshold for a second source material being shown on the shared client computer screen.

7. The method of claim 1, further comprising:
determining when the server computer does not meet the QoS threshold;
ascertaining a QoS level for the server computer, based on the plurality of factors;
changing the QoS threshold based on the QoS level; and
selecting the server computer based on the changed QoS threshold to record the web conference.

8. The method of claim 1, further comprising:
receiving a plurality of opinion scores from multiple users of the shared client computer screen; and
determining a MOS (mean opinion score) as one of the plurality of factors for determining the QoS threshold.

9. The method of claim 1, further comprising:
determining a plurality of QoS levels selected from a group consisting of unacceptable, marginal, and acceptable.

10. The method of claim 9, further comprising:
providing a notification of change to the client computer, the notification of change including one of the plurality of QoS levels.

11. The method of claim 1, wherein the recording is selected from a group consisting of an audio recording and a video recording.

12. The method of claim 1, further comprising:
generating a master recording from the respective time segments of the recording.

13. The method of claim 1, further comprising:
recording the web conference at the server computer when the server network connection meets the QoS threshold.

14. A system for ensuring recording quality of a web conference in a computer networked environment, the system comprising:
a computer system comprising: a computer processor, a computer-readable storage medium, and program instructions stored on the computer-readable storage medium being executable by the processor, to cause the computer system to perform a method, comprising:
monitoring a web conference including a network connection for a server computer being connected to a client computer initiating the web conference, the client computer having a shared client computer screen being shared with one or more other client computers in a networked computer environment communicating with the server, the server computer being remote from the client computer, the web conference having a beginning time and an end time, and a complete length of time determined by the begin time and the end time, the complete length of time being parsable into time segments based on recording at a server network connection and a client network connection;
setting a quality of service (QoS) threshold for recording and displaying the web conference for viewing the web conference by users, the QoS threshold including one or more factors;
determining a QoS level at the server network connection of the server computer, the QoS level being determined using the one or more factors;
recording the web conference using the server network connection at the server computer, or at the client network connection at the client computer, but not at both, based on the QoS threshold being met using the server network connection for recording the web conference;
selecting a client computer of the one or more client computers for recording the web conference based on a QoS level at each of the one or more client computers;

initiating the recording on the selected client computer;
monitoring the QoS level at the server computer to determine when the QoS threshold is met at the server network connection;
switching the recording between the server computer using the server network connection and the client computer using the client network connection for respective time segments of the recording, in response to the server network connection meeting the QoS threshold, and falling below the QoS threshold, respectively, thereby recording the web conference at the client computer when the server network connection falls below the QoS threshold;
parsing the web conference into time segments based on the complete length of time of the web conference and based on a place of recording;
associating each of the time segments with meeting the QoS threshold and the place of recording, that is the server computer or the client computer; and
re-assembling the time segments into a master recording form the server computer and the client computer, the time segments equal the complete length of time of the web conference in the master recording which includes all the time segments that compose the complete length of time.

15. The system of claim 14, further comprising:
recording the web conference alternately at the server network connection or the client network connection;
recording the web conference at the server network connection in response to the server network connection meeting or exceed the QoS threshold; and
recording at the client network connection in response to the QoS threshold not being met at the server network connection.

16. The system of claim 14, further comprising:
recording the web conference using the server network connection at the server computer, the web conference having a beginning time and an end time, and a complete length of time determined by the begin time and the end time, the complete length of time being parsable into time segments based on recording at the server network connection and the client network connection;
determining when the QoS threshold is not met at the server network connection of the server computer;
initiating a local recording at the client network connection at the client computer, in response to the QoS threshold not being met at the server network connection;
returning to the recording of the web conference at the server network connection, in response to the QoS threshold being met or exceeded at the server network connection;
analyzing the time segments of the web conference recorded at the server network connection and the client network connection to associate each of the time segments with meeting the QoS threshold, the time segments being equal to the complete length of time of the web conference; and
creating a master recording consisting of the time segments meeting the QoS threshold and equal to the complete length of time of the web conference.

17. The system of claim 14, further comprising:
a plurality of client computers;
selecting a client computer of the plurality of client computers for recording the web conference based on a QoS level at each of the client computers; and
initiating recording on the selected client computer.

18. A computer program product for ensuring recording quality of a web conference in a computer networked environment, the computer program product comprising a computer readable storage medium having program instructions embodied therewith, wherein the computer readable storage medium is not a transitory signal per se, the program instructions executable by a computer to cause the computer to perform a method, comprising:
monitoring a web conference including a network connection for a server computer being connected to a client computer initiating the web conference, the client computer having a shared client computer screen being shared with one or more other client computers in a networked computer environment communicating with the server, the server computer being remote from the client computer, the web conference having a beginning time and an end time, and a complete length of time determined by the begin time and the end time, the complete length of time being parsable into time segments based on recording at a server network connection and a client network connection;
setting a quality of service (QoS) threshold for recording and displaying the web conference for viewing the web conference by users, the QoS threshold including one or more factors;
determining a QoS level at the server network connection of the server computer, the QoS level being determined using the one or more factors;
recording the web conference using the server network connection at the server computer, or at the client network connection at the client computer, but not at both, based on the QoS threshold being met using the server network connection for recording the web conference;
selecting a client computer of the one or more client computers for recording the web conference based on a QoS level at each of the one or more client computers;
initiating the recording on the selected client computer;
monitoring the QoS level at the server computer to determine when the QoS threshold is met at the server network connection;
switching the recording between the server computer using the server network connection and the client computer using the client network connection for respective time segments of the recording, in response to the server network connection meeting the QoS threshold, and falling below the QoS threshold, respectively,
thereby recording the web conference at the client computer when the server network connection falls below the QoS threshold;
parsing the web conference into time segments based on the complete length of time of the web conference and based on a place of recording;
associating each of the time segments with meeting the QoS threshold and the place of recording, that is the server computer or the client computer; and
re-assembling the time segments into a master recording form the server computer and the client computer, the time segments equal the complete length of time of the web conference in the master recording which includes all the time segments that compose the complete length of time.

19. The computer program product of claim 18, further comprising:

recording the web conference alternately at the server network connection or the client network connection;

recording the web conference at the server network connection in response to the server network connection meeting or exceed the QoS threshold; and recording at the client network connection in response to the QoS threshold not being met at the server network connection.

20. The computer program product of claim 18, further comprising:

recording the web conference using the server network connection at the server computer, the web conference having a beginning time and an end time, and a complete length of time determined by the begin time and the end time, the complete length of time being parsable into time segments based on recording at the server network connection and the client network connection;

determining when the QoS threshold is not met at the server network connection of the server computer;

initiating a local recording at the client network connection at the client computer, in response to the QoS threshold not being met at the server network connection;

returning to the recording of the web conference at the server network connection, in response to the QoS threshold being met or exceeded at the server network connection;

analyzing the time segments of the web conference recorded at the server network connection and the client network connection to associate each of the time segments with meeting the QoS threshold, the time segments being equal to the complete length of time of the web conference; and creating a master recording consisting of the time segments meeting the QoS threshold and equal to the complete length of time of the web conference.

\* \* \* \* \*